United States Patent
Ke et al.

(10) Patent No.: US 8,649,308 B2
(45) Date of Patent: Feb. 11, 2014

(54) METHOD AND DEVICE FOR CONFIRMING DOWNLINK INNER LOOP POWER CONTROL MODE BY BASE STATION

(75) Inventors: Yazhu Ke, Guangdong Province (CN); Xiang Cheng, Guangdong Province (CN); Lin Liu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/257,654

(22) PCT Filed: Aug. 17, 2010

(86) PCT No.: PCT/CN2010/076054
§ 371 (c)(1),
(2), (4) Date: Nov. 9, 2011

(87) PCT Pub. No.: WO2011/057515
PCT Pub. Date: May 19, 2011

(65) Prior Publication Data
US 2012/0224520 A1 Sep. 6, 2012

(30) Foreign Application Priority Data
Nov. 10, 2009 (CN) .......................... 2009 1 0210824

(51) Int. Cl.
*G08C 17/00* (2006.01)
(52) U.S. Cl.
USPC ............ 370/311; 370/241; 370/252; 370/329
(58) Field of Classification Search
None
See application file for complete search history.

(56) References Cited

U.S. PATENT DOCUMENTS

| | | | |
|---|---|---|---|
| 7,853,266 B2 * | 12/2010 | Moinet et al. ................. | 455/453 |
| 2006/0098599 A1 * | 5/2006 | Choi et al. .................... | 370/331 |
| 2010/0167777 A1 * | 7/2010 | Raghothaman et al. ...... | 455/522 |

FOREIGN PATENT DOCUMENTS

| | | |
|---|---|---|
| CN | 101026396 A | 8/2007 |
| WO | WO2009/096830 A1 * | 8/2009 |

OTHER PUBLICATIONS

Technical Specfication Group Radio Access Network. 3GPP TS 25.214 V9.0.0: Physical layer procedures (FDD) (Release 9). 3rd Generation Partnership Project (3GPP) Sep. 28, 2009.
International Search Report for PCT/CN2010/076054 dated Nov. 9, 2010.
R3-092743, SGPP TSG-RAN WG3 #66, Nov. 9-13, 2009, Jeju, Korea, see pp. 2-8.

(Continued)

*Primary Examiner* — David Oveissi
(74) *Attorney, Agent, or Firm* — Ling Wu; Stephen Yang; Ling and Yang Intellectual Property

(57) ABSTRACT

The invention provides a method and a device for confirming a downlink inner loop power control mode by a Node B in an idle mode and in a CELL_FACH state. The method includes that: when the Node B detects that there is User Equipment (UE) using an E-DCH in the idle mode or in the CELL_FACH state, confirming to use a mode 0 to receive Transmit Power Control (TPC) bit information sent on a Dedicated Physical Control Channel (DPCCH) by the UE, and performing downlink inner loop power control on a Fractional Dedicated Physical Channel (F-DPCH). The method and device provided in the invention enable the inner loop power control mode for the F-DPCH made by the Node B to be consistent with the TPC bit information mode fed back by the UE, and enable the F-DPCH to use proper transmit power to transmit.

8 Claims, 2 Drawing Sheets

(56) References Cited

OTHER PUBLICATIONS

R3-092744, 3GPP TSG-RAN WG3 #66, Nov. 9-13, 2009, Jeju, Korea, see pp. 2-8.

"3GPP TS 25.331 V9.0.0" Sep. 2009, 3rd Generation Partnership Project; Technical Specification Group Radio Access Network; Radio Resource Control (RRC); Protocol Specification (Release 9); See the whole document.

"3GPP TS 25.433 V9.0.0" Sep. 2009, 3rd Generation Partnership Project; Technical Specification Group Radio Access Network; UTRAN lub interface Node B Application Part (NBAP); signalling (Release 9); See the whole document.

* cited by examiner

METHOD AND DEVICE FOR CONFIRMING DOWNLINK INNER LOOP POWER CONTROL MODE BY BASE STATION

TECHNICAL FIELD

The invention relates to the communication field, and particularly, to a method and a device for confirming a downlink inner loop power control mode by a Node B.

BACKGROUND OF THE RELATED ART

Along with the evolution of the mobile communication system, the quality of service for users has become a primary target of the operator, which affects the service performance and also determines the satisfaction degree of users on the service. A very important aspect of improving the quality of service for users is the time delay during establishing the connection and allocating the channel, besides relatively frequent service with small data packets also exits, and thus it is needed to consider how could the common channel work more efficiently. For example, the uplink and downlink signaling delay is reduced. The downlink signaling delay of User Equipment (UE) of a plurality of states of the Cell Forward Access Channel (CELL_FACH), the Cell Paging Channel (CELL_PCH), and the Universal Terrestrial Radio Access Network Registration Area Paging Channel (URA_PCH) in the connection mode is implemented by introducing downlink High Speed Packet Access (HSPA) in the 3rd Generation Partnership Project (3GPP) standard, and the problem of the uplink signaling delay also exists.

A plurality of following aspects should be considered for reducing the uplink signaling delay:

(1) reducing the Idle mode, reducing the waiting time of the user plane and the control plane in CELL_FACH, CELL_PCH and URA_PCH states;

(2) increasing the peak rate of the CELL_FACH state;

(3) reducing transition delays among states of Idle, CELL_FACH, CELL_PCH, URA_PCH and CELL_DCH.

In order to achieve the above objects, the 3GPP standard has solved by introducing use of the Enhanced Dedicated Channel (E-DCH) in the CELL_FACH state and in the Idle mode, i.e. a way of using the High Speed Uplink Packet Access (HSUPA) can be introduced in the Idle mode and the CELL_FACH state. For a convenience of description, the technique of the Idle state and the CELL_FACH state using the high speed uplink packet access is called as the uplink enhanced CELL_FACH technique in the article.

The fundamental principle of the uplink enhanced CELL_FACH technique is as follows: the sending principle of random access still adopts the random access process of the Physical Random Access Channel (PRACH), but channel types change, i.e. the E-DCH can be adopted in the Idle mode and the CELL_FACH state, and logical channels of the Common Control Channel (CCCH)/Dedicated Control Channel (DCCH)/Dedicated Traffic Channel (DTCH) could all be sent by mapping into the E-DCH. The E-DCH is mapped into the E-DCH Dedicated Physical Data Channel (E-DPDCH), the E-DPDCH is required to work normally just through the E-DCH Dedicated Physical Control Channel (E-DPCCH), whereas the E-DPCCH could work just based on a foundation of the Dedicated Physical Control Channel (DPCCH), and thus the DPCCH physical channel should exist in the uplink in the enhanced CELL_FACH state, and the Fractional Dedicated Physical Control Channel (F-DPCH) should also exist in the downlink for coordinating with the normal work of the uplink DPCCH to carry out link synchronization. The DPCCH channel is introduced in the uplink and the F-DPCH channel is introduced in the downlink in the CELL_FACH state and the Idle mode, and therefore, the inner loop power control should be performed between the uplink and downlink to be just able to guarantee to maintain the link synchronization in the duration of using E-DCH common resource.

Presently inner loop power control of UE for the dedicated state (i.e. the CELL_DCH state, allocating dedicated resources for a user) differentiates the uplink and downlink, there are two uplink inner loop power control algorithms: algorithm 1 (inner loop power control is needed in every slot) and algorithm 2 (once inner loop power control is needed in every 5 slots); and there are also two downlink inner loop power control modes (DPC MODE): mode 0 (inner loop power control is needed in every slot) and mode 1 (once inner loop power control is needed in every 3 slots).

Presently the Uu interface (the interface between UE and the RNC) in the 3GPP defines that downlink inner loop power control of UE in the Idle mode and the CELL_FACH state could only adopt mode 0 (i.e. DPC MODE=0) instead of the Radio Network Control (RNC) notifying UE through signaling. However, DPC MODE configuration information elements used in the Idle state and the CELL_FACH state at the Iub interface (the interface between the RNC and the Node B) of the RNC exist, the DPC MODE could be configured as two modes (MODE 0 and MODE 1), and it is not clearly explained in the Iub interface protocol that only DPC MODE 0 could be used by the Node B in this scenario (i.e. UE is in the Idle mode or the CELL_FACH state). Therefore, following problems will exist in this scenario: if the RNC configures the nonzero mode for DPC MODE, then the Node B will receive Transmit Power Control (TPC) bit information in the UE uplink DPCCH according to the nonzero mode configured by the RNC to make inner loop power control, but UE constantly adopts MODE 0 to send TPC bit information, which will result in that F-DPCH transmit power adjusted by the Node B is not that of expecting to be received by UE, and thus F-DPCH transmit power is possibly adjusted to be too small to result in the link failure and be unable to work normally, or the F-DPCH transmit power is possibly adjusted to be too large which wastes downlink power resources and increases the interference to other physical channels.

In view of drawbacks exiting in the above mentioned prior art, it is necessary to provide a method for confirming a downlink inner loop power control mode in the Idle mode and the CELL_FACH state by the Node B, which solves the problem that the inner loop power control mode for the F-DPCH made by the Node B is not consistent with the TPC bit mode fed back by UE.

SUMMARY OF THE INVENTION

The technical problem to be solved in the invention is to provide a method and a device for confirming a downlink inner loop power control mode, which enable the inner loop power control mode for the F-DPCH made by the Node B to be consistent with the TPC bit mode fed back by UE.

In order to solve the above problem, the invention provides a method for confirming a downlink inner loop power control mode by a Node B, and the method comprises:

when the Node B detects that there is user equipment (UE) in an idle mode or a Cell Forward Access Channel (CELL_FACH) state using an E-DCH, confirming to use a mode 0 to receive Transmit Power Control (TPC) bit information sent on an uplink Dedicated Physical Control Channel (DPCCH) by the UE, and performing downlink inner loop power control on a Fractional Dedicated Physical Control Channel (F-DPCH).

The UE can use the mode 0 to send the TPC bit information to the Node B in the idle mode or the CELL_FACH state.

Before the step of the Node B detecting, the method further comprises:

a radio network controller can notify the Node B of common E-DCH configuration information by a physical shared channel reconfiguration request message; and after receiving the physical shared channel reconfiguration request message, the Node B can choose to store common E-DCH configuration information in the physical shared channel reconfiguration request message, and can return a physical shared channel reconfiguration response message to the radio network controller.

The common E-DCH configuration information could be configured in common E-DCH system information in the physical shared channel reconfiguration request message.

The step of the Node B storing common E-DCH configuration information can comprise: the Node B can choose to store all the common E-DCH configuration information when the common E-DCH system information excludes configuration information of a downlink inner loop power control mode (DPC MODE).

The step of the Node B storing common E-DCH configuration information can comprise: the Node B can choose to store other common E-DCH configuration information except configuration information of a DPC MODE when the common E-DCH system information includes the configuration information of the DPC MODE.

The invention further provides a device for confirming a downlink inner loop power control mode by a Node B, which is applied in the Node B, and the device comprises:

a DPC mode confirmation module, which is configured to: when detecting that there is UE in an idle mode or a CELL_FACH state using an E-DCH, confirm to use a mode 0 to receive TPC bit information sent on an DPCCH by the UE, and perform downlink inner loop power control on a F-DPCH.

The device can also comprise:

a common E-DCH configuration module, which is configured to: choose to store common E-DCH configuration information in a physical shared channel reconfiguration request message after receiving the common E-DCH configuration information notified by a radio network controller through the physical shared channel reconfiguration request message, and return a physical shared channel reconfiguration response message to the radio network controller. The common E-DCH configuration module may be also configured to: if the radio network controller configures the common E-DCH configuration information by common E-DCH system information in the physical shared channel reconfiguration request message and the common E-DCH system information includes configuration information of a DPC MODE, choose to store other common E-DCH configuration information except configuration information of the DPC MODE; or else, choose to store all the common E-DCH configuration information.

The UE can use the mode 0 to send the TPC bit information to the Node B in the idle mode or the CELL_FACH state.

The invention provides a method and a device for confirming a downlink inner loop power control mode in an Idle mode and a CELL_FACH state by a Node B, which enable the inner loop power control mode for the F-DPCH made by the Node B to be consistent with the TPC bit information mode fed back by UE, enable the F-DPCH to use proper transmit power to transmit, guarantee UE to be able to synchronize with the F-DPCH channel, and maintain the link to be able to work normally, thereby guaranteeing the Node B to be able to correctly receive data information sent on the E-DPDCH.

PREFERRED EMBODIMENTS OF THE PRESENT INVENTION

The invention adopts the following technical schemes:

step 1, a radio network controller notifies a Node B of common E-DCH configuration information by signaling, and the Node B chooses to store common E-DCH configuration information notified in the signaling, and returns a response message;

step 2, when the Node B detects there is UE adopting an E-DCH in an Idle mode or a CELL_FACH state, the Node B adopts a mode 0 to perform downlink inner loop power control on a F-DPCH.

Therein, after the RNC configuring common E-DCH configuration information for the Node B in step 1, the Node B can detect whether there is UE in the Idle mode or the CELL_FACH state adopting the E-DCH according to the prior art in step 2.

Therein, the signaling messages in step 1 could be a physical shared channel reconfiguration request message and a physical shared channel reconfiguration response message.

Furthermore, the common E-DCH configuration information in step 1 is configured by Common E-DCH System Information in the physical shared channel reconfiguration message. The common E-DCH configuration information refers to common information which is needed to configure for the use of the E-DCH in the Idle or CELL_FACH state.

Furthermore, the common E-DCH system information excludes configuration information of DPC MODE; or the common E-DCH system information includes configuration information of DPC MODE, but the Node B chooses to store other common E-DCH configuration information except the configuration information of DPC MODE. That is to say that the Node B ignores the configuration information of DPC MODE no matter what mode the RNC configures.

Below it will describe the implementation of technical schemes of the inventive in more detail with reference to figures and particular examples.

Example 1

Figure 1:
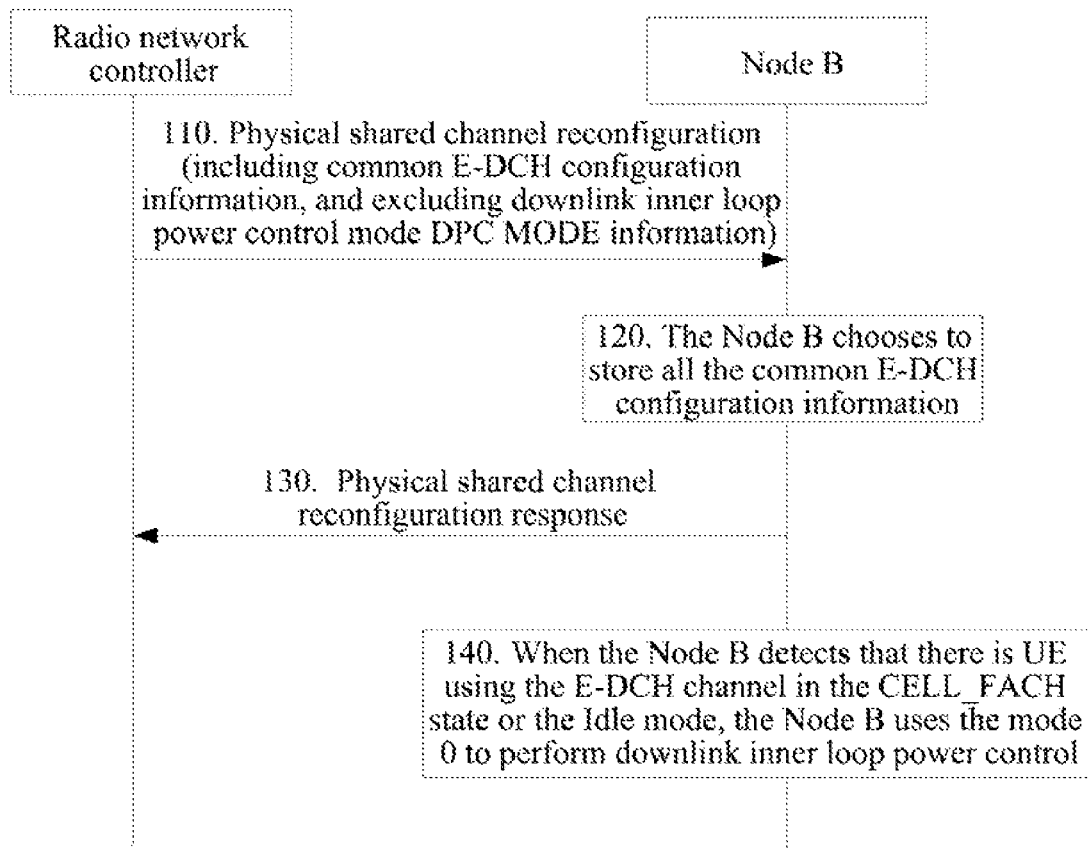
FIG. 1 is a flow chart of method of example 1 according to the invention.

When UE is in the CELL_FACH state or the Idle mode, the method for confirming a downlink inner loop power control mode by the Node B, as shown in FIG. 1, mainly comprises following steps of:

step 110, the radio network controller notifies the Node B of common E-DCH configuration information by physical shared channel reconfiguration information, which excludes downlink inner loop power control mode information;

step 120, the Node B chooses to store all the common E-DCH configuration information notified in the signaling;

step 130, the Node B returns the physical shared channel reconfiguration response message to the radio network controller;

step 140, when the Node B detects that there is UE using the E-DCH channel in the CELL_FACH state or the Idle mode, the Node B uses the mode 0 to receive TPC bit information in the UE uplink DPCCH, and performs downlink inner loop power control on the F-DPCH.

Example 2

Figure 2:
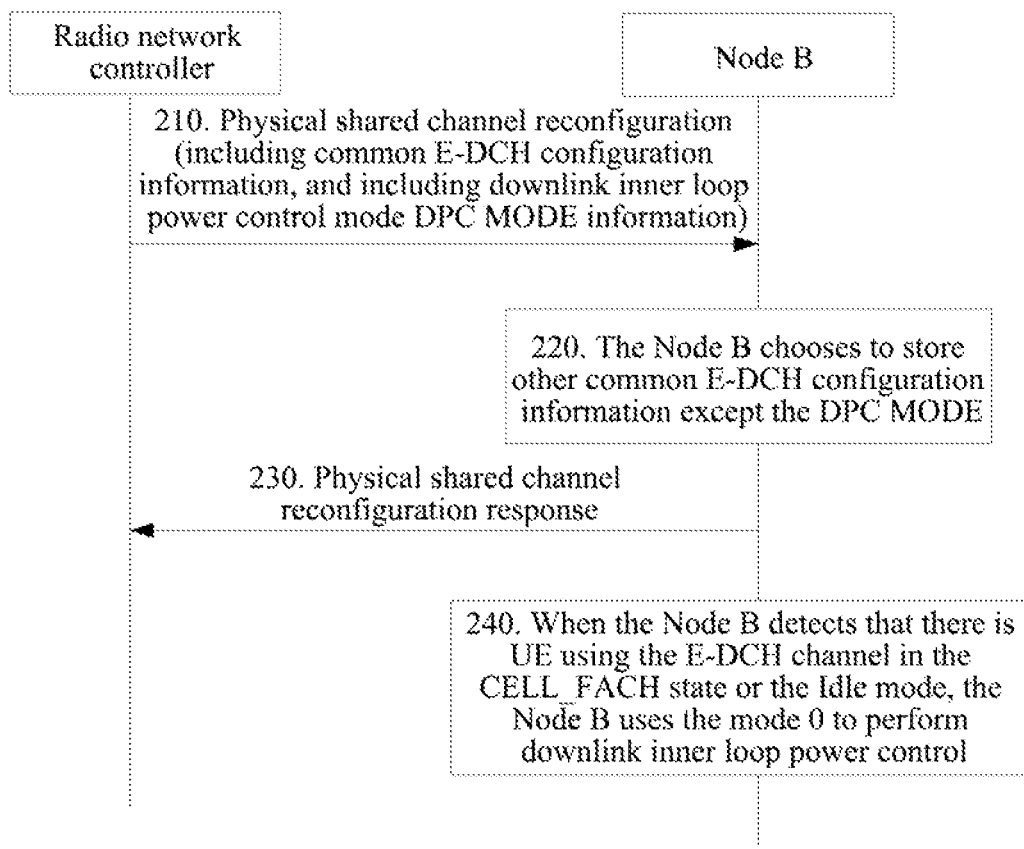
FIG. 2 is a flow chart of method of example 2 in the invention.

When UE is in the CELL_FACH state or the Idle mode, the method for confirming a downlink inner loop power control mode by the Node B, as shown in FIG. 2, mainly comprises following steps of:

step 210, the radio network controller notifies the Node B of common E-DCH configuration information by physical shared channel reconfiguration information, which includes downlink inner loop power control mode information;

step 220, the Node B stores other common E-DCH configuration information notified in the signaling except downlink inner loop power control mode information;

step 230, the Node B returns the physical shared channel reconfiguration response message to the radio network controller;

step 240, when the Node B detects that there is UE using the E-DCH channel in the CELL_FACH state or the Idle mode, the Node B uses the mode 0 to receive TPC bit information in the UE uplink DPCCH, and performs downlink inner loop power control on the F-DPCH.

Besides, the invention also provides a device for confirming a downlink inner loop power control mode by the Node B (not shown in figures), which is applied in the Node B, and the device comprises:

a DPC mode confirmation module, which is configured to: confirm to use the mode 0 to receive TPC bit information sent by the UE in the DPCCH when detecting that there is UE in the Idle mode or the CELL_FACH state using the E-DCH channel, and perform downlink inner loop power control on the F-DPCH.

Furthermore, the device further includes a common E-DCH configuration module, which is configured to: choose to store the common E-DCH configuration information in a physical shared channel reconfiguration request message after receiving the common E-DCH configuration information notified by the radio network controller through the physical shared channel reconfiguration request message, and return a physical shared channel reconfiguration response message to the radio network controller.

Furthermore, the above common E-DCH configuration module is also configured to: if the radio network controller configures the common E-DCH configuration information by common E-DCH system information in the physical shared channel reconfiguration request message and the common E-DCH system information includes configuration information of DPC MODE, choose to store other common E-DCH configuration information except the DPC MODE configuration information; or else, choose to store all the common E-DCH configuration information.

The above description is just the preferable examples of the invention, which is not intended to limit the protection scope of the invention. There could be various other examples of the invention, various modifications and transformations could be made to the invention by those skilled in the art without departing from the spirit and essentiality of the invention, and those corresponding modifications and transformations should all fall into the protection scope of attached claims of the invention.

INDUSTRIAL APPLICABILITY

The invention provides a method and a device for confirming a downlink inner loop power control mode in an Idle mode and a CELL_FACH state by a Node B, which enable the inner loop power control mode for the F-DPCH made by the Node B to be consistent with the TPC bit information mode fed back by UE, enable the F-DPCH to use proper transmit power to transmit, guarantee UE to be able to synchronize with the F-DPCH, and maintain the link to be able to work normally, thereby guaranteeing the Node B to be able to correctly receive data information sent on the E-DPDCH.

What is claimed is:

1. A method for confirming a downlink inner loop power control mode by a Node B, and the method comprising:

when the Node B detects that there is user equipment (UE) in an idle mode or a Cell Forward Access Channel (CELL_FACH) state using an Enhanced Dedicated Channel (E-DCH), confirming to use a mode 0 to receive Transmit Power Control (TPC) bit information sent on an uplink Dedicated Physical Control Channel (DPCCH) by said UE, and performing downlink inner loop power control on a Fractional Dedicated Physical Control Channel (F-DPCH);

wherein, before the step of the Node B detecting, the method further comprises:

a radio network controller notifying said Node B of common E-DCH configuration information by a physical shared channel reconfiguration request message; and after receiving said physical shared channel reconfiguration request message, said Node B choosing to store the common E-DCH configuration information in said physical shared channel reconfiguration request message, and returning a physical shared channel reconfiguration response message to the radio network controller.

2. The method of claim 1, wherein, said UE uses the mode 0 to send said TPC bit information to said Node B in said idle mode or said CELL_FACH state.

3. The method of claim 1, wherein, said common E-DCH configuration information is configured in common E-DCH system information in said physical shared channel reconfiguration request message.

4. The method of claim 3, wherein the step of said Node B storing the common E-DCH configuration information comprises:

said Node B choosing to store all the common E-DCH configuration information when said common E-DCH system information excludes configuration information of a downlink inner loop power control mode (DPC MODE).

5. The method of claim 3, wherein the step of said Node B storing the common E-DCH configuration information comprises:

said Node B choosing to store other common E-DCH configuration information except configuration information of a downlink inner loop power control mode (DPC MODE) when said common E-DCH system information includes configuration information of said DPC MODE.

6. A device for confirming a downlink inner loop power control mode by a Node B, which is applied to in the Node B, and the device comprising:

a downlink inner loop power control (DPC) mode confirmation module, which is configured to: when detecting that there is user equipment (UE) in an idle mode or a Cell Forward Access Channel (CELL_FACH) state using an Enhanced Dedicated Channel (E-DCH), confirm to use a mode 0 to receive Transmit Power Control (TPC) bit information sent on an uplink Dedicated Physical Control Channel (DPCCH) by said UE, and perform downlink inner loop power control on a Fractional Dedicated Physical Control Channel (F-DPCH); and a common E-DCH configuration module, which is configured to: choose to store common E-DCH configuration information in a physical shared channel reconfiguration request message after receiving the common E-DCH configuration information notified by a radio network controller through the physical shared channel reconfiguration request message, and return a physical shared channel reconfiguration response message to the radio network controller.

7. The device of claim 6, wherein, the common E-DCH configuration module is also configured to: if the radio network controller configures the common E-DCH configuration information by common E-DCH system information in the physical shared channel reconfiguration request message and the common E-DCH system information includes configuration information of a downlink inner loop power control mode (DPC MODE), choose to store other common E-DCH configuration information except configuration information of the DPC MODE; or else, choose to store all the common E-DCH configuration information.

8. The device of claim 6, wherein, said UE uses the mode 0 to send said TPC bit information to said Node B in said idle mode or said CELL_FACH state.

* * * * *